July 12, 1938.  R. L. COTTA  2,123,649
COMBINED BORING AND MILLING MACHINE DRIVE
Filed Sept. 1, 1937  3 Sheets-Sheet 1

Inventor
Ralph L. Cotta
By his Attorneys
Howson & Howson

July 12, 1938. R. L. COTTA 2,123,649
COMBINED BORING AND MILLING MACHINE DRIVE
Filed Sept. 1, 1937 3 Sheets-Sheet 2

July 12, 1938.                R. L. COTTA                2,123,649
              COMBINED BORING AND MILLING MACHINE DRIVE
                Filed Sept. 1, 1937        3 Sheets-Sheet 3

Inventor
Ralph L. Cotta
by his Attorneys
Howson & Howson

Patented July 12, 1938

2,123,649

UNITED STATES PATENT OFFICE 2,123,649

COMBINED BORING AND MILLING MACHINE DRIVE

Ralph L. Cotta, Philadelphia, Pa., assignor to William Sellers & Company, Incorporated, Philadelphia, Pa., a corporation of Pennsylvania Application September 1, 1937, Serial No. 162,023

8 Claims. (Cl. 29—26)

This invention relates to machine tools, and more particularly to a drive for controlling the several movements of the various operating parts of machine tools such as horizontal boring and milling machines. Such machines usually comprise a bed or work support upon which is mounted for longitudinal movement a saddle which, in turn, bears a table mounted for transverse movement. Columns arise from opposite ends of the bed, one carrying a boring head and the other an outboard support for the boring spindle. The head and outboard support are vertically shiftable upon their respective columns and the head carries a spindle, or spindles, which must be both rotated and longitudinally shifted. Since the spindle rotation and traverse of one of the movable elements must take place simultaneously, separate driving transmissions must be provided to take care of these operations. The transmission governing the rotation of the spindle must be made reversible to enable use of right or left-hand cutters, taps or the like, and the transmission controlling the spindle feed must derive its power from the spindle itself for, obviously, in tapping, thread-cutting operations and the like the rotative speed of the spindle must be accurately correlated to the speed at which the spindle is fed. Furthermore, the spindle feed must be reversible simultaneously with the spindle in order that tools such as taps may be properly withdrawn. It will be seen that if this spindle feed transmission is used to control the feeds of the head, saddle and table each time that the spindle feed is reversed or the direction of rotation of the spindle reversed, the direction of operation of the three remaining units would be likewise reversed, with the result that control handles utilized in connecting these parts with the feed transmission will be meaningless as to position, a given position at one time causing feed of the associated unit in one direction and at another time feed of the unit in the opposite direction.

An important object of this invention is the provision of a construction such that the feed transmission controlling the feed of the spindle may likewise be employed in operation of the head, table and saddle while still enabling the use of levers the positions of which will indicate the direction of movement of the part with which they are associated.

Another object of the invention is the provision of a construction such that a single pilot wheel may be utilized in feeding of any of the spindle, the head, the table or the saddle, and when employed in feeding the head, table or saddle may be operated in either direction to provide movement of the affected part in the direction selected by its individual control lever.

These and other objects I attain by the construction shown in the accompanying drawings wherein, for the purpose of illustration, I have shown a preferred embodiment of my invention and wherein.

Figure 1:
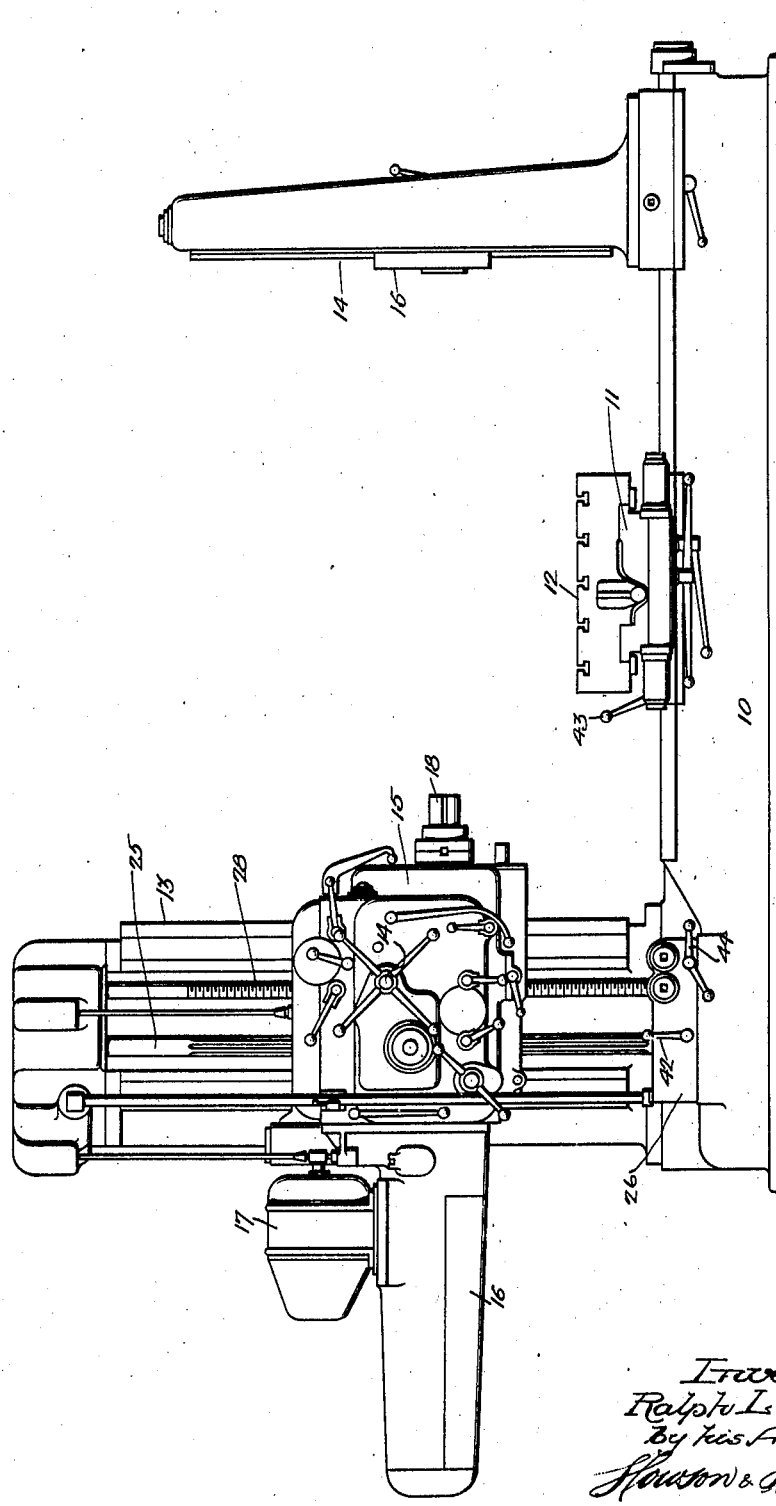
Fig. 1 is a side elevation of a combined boring and milling machine embodying a drive constructed in accordance with my invention.
Figure 2:
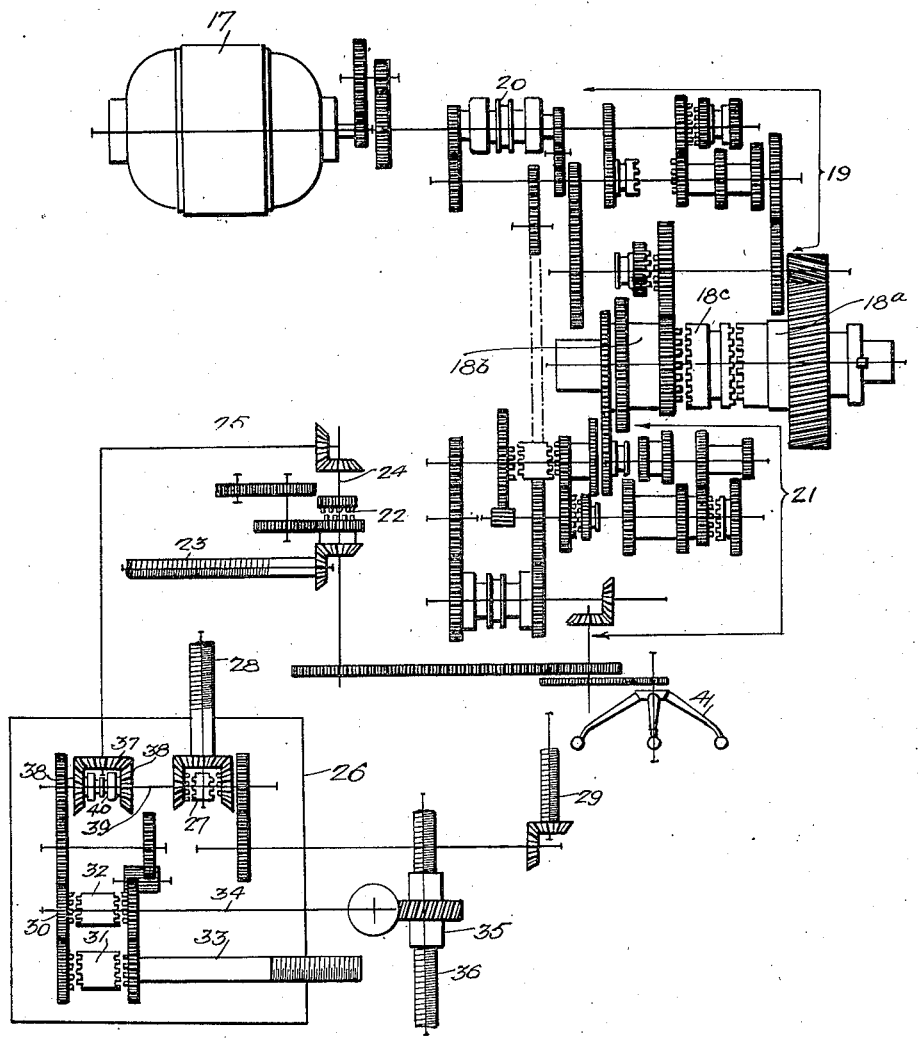
Fig. 2 is a diagrammatic illustration of the transmission mechanism employed.
Figure 3:
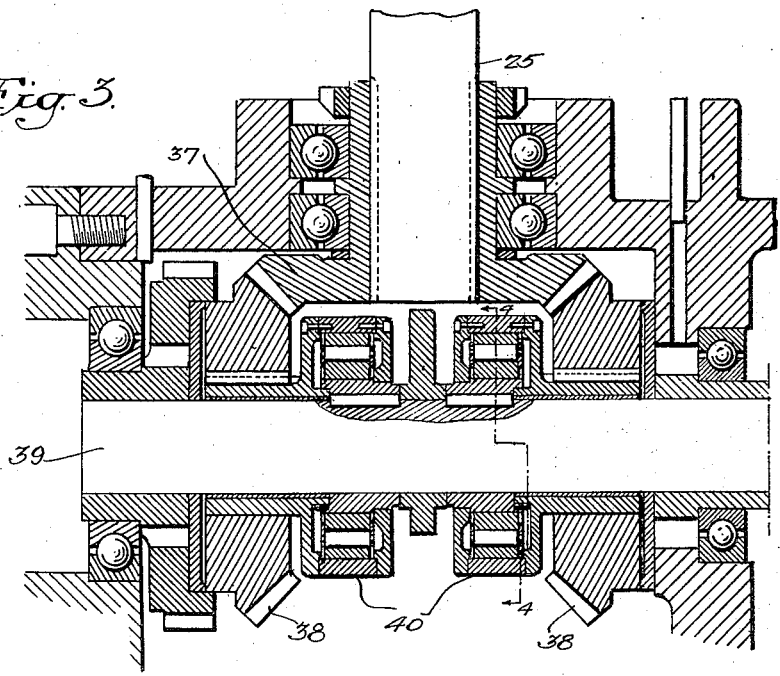
Fig. 3 is an enlarged sectional view through the unidirectional drive.
Figure 4:
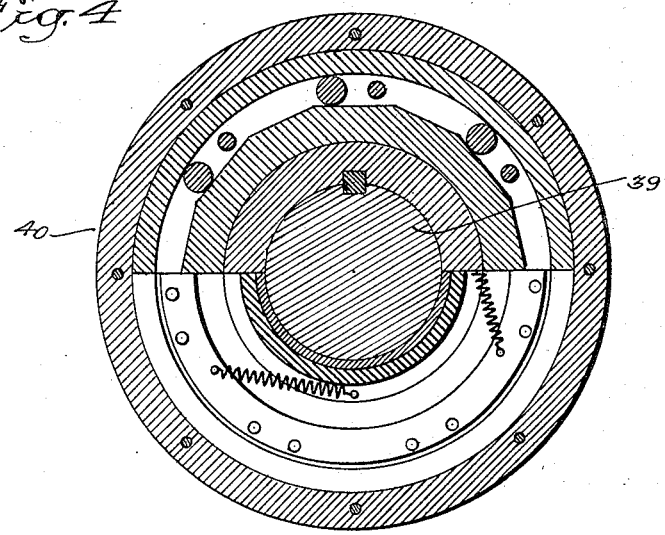
Fig. 4 is a section on line 4—4 of Fig. 3.

Referring now more particularly to the drawings, the numeral 10 generally designates a base upon which is mounted for longitudinal movement a saddle 11 and table 12. Mounted at opposite ends of the base are columns 13 and 14 upon which are mounted for vertical movement a boring head 15 and an outboard support 16. The head supports a driving motor 17 and mounts a spindle, or spindles, 18 for both rotation and longitudinal movement. Contained within the head is a speed control transmission unit 19 driven from the motor through a reversing gearing 20 and driving spindle-operating units 18a and 18b selectively connectable to the spindle by a clutch 18c having a neutral point. Likewise contained in the head and driven from the unit 18b is a feed control transmission 21 driving, through a reversing gear 22, the spindle feed screw 23. The output shaft 24 of the feed control transmission drives a vertical lay shaft 25 which, as in general constructions, is splined to permit vertical movement of the head. In the base of the machine a casing 26 is provided into which the lower end of the shaft 25 extends, and in this casing are disposed a reversing gear 27 controlling rotation of the screws 28 and 29 which control vertical movement of the head and outboard support respectively and a reversing gear 30 which, through clutches 31 and 32, controls the operation of the saddle feed screw 33 and the table drive shaft 34 operating the drive nut 35 engaging the table feed screw 36. These elements in the main are merely conventionally indicated, since they may be of any usual and well-known construction.

Bevel gear 37 secured to the lower end of lay shaft 25 meshes with a pair of oppositely faced bevel gears 38, loosely mounted on a shaft 39 and each provided with an overrunning clutch 40 through which shaft 39 can be driven in one direction only. It will be obvious that since these gears 38 are oppositely driven by gear 37, shaft 39 will be driven from the bevel gear which is running in the predetermined unidirection without regard to the direction of operation of the spindle feed from which this drive is derived. It is thus possible to utilize a single feed unit in operation of the various movable elements of the machine.

It will be obvious that, since shaft 39 is unidirectional and controls the operation of the various movable elements including head 15 and outboard support 16, which may be considered as a unit, the saddle 11 and table 12, the control levers 42, 43 and 44 controlling respectively the saddle 11, table 12, and head 15, may be so positioned that a movement in a given direction thereof will cause a movement of the associated part in the same direction, and this without regard to whether or not the reversible transmission from which they derive their power is operated in one or the other direction.

The output shaft 24 of the feed unit, in addition to being movable through its motor drive, is movable through a pilot wheel 41 which may be selectively engaged therewith through the usual clutch mechanisms, not herein disclosed. Pilot wheel 41 may, therefore, be employed in operation of any of the movable elements since the output shaft 24 controls, through the several clutches and reversing mechanisms 27, 31, and 32, the operation of each of the movable elements. This feature is of considerable advantage in the type of machine illustrated in that the operator may set the control levers for movement of the selected part in the selected direction and, without reference to the direction of movement of the pilot wheel 41, may shift the selected part in a selected direction. If, for example, while standing close to his work he is able to reach an arm of the pilot wheel but is unable to move that arm through a sufficient arc to enable him to grasp a further arm, he may oscillate the pilot wheel and thereby produce a continuous movement of the affected part in the selected direction.

Since the construction of the various elements may be considerably varied and the arrangement of the transmissions and transmitting shafts may likewise be varied to suit any particular set of conditions for which the machine must be constructed, I do not wish to be understood as limiting myself to the particular arrangement therein illustrated except as hereinafter claimed.

I claim:

1. In a machine tool embodying a vertically movable head, an axially movable spindle carried by the head, a horizontally movable saddle and a table movable transversely upon the saddle, a reversible variable speed transmission having an output shaft controlling the axial movement of the spindle, a second shaft, an irreversible driving connection between said second shaft and the output shaft of the transmission and a reversible driving connection between the first-named shaft and feeding means for each of said head, said saddle and said table.

2. In a machine tool embodying a vertically movable head, an axially movable spindle carried by the head, a horizontally movable saddle and a table movable transversely upon the saddle, a reversible variable speed transmission having an output shaft controlling the axial movement of the spindle, a shaft, an irreversible driving connection between said shaft and the output shaft of the transmission, a reversible driving connection between the first-named shaft and feeding means for each of said head, said saddle and said table, and means to manually operate the output shaft of the transmission.

3. In a machine tool embodying a vertically movable head, an axially movable spindle carried by the head, a reversible variable speed transmission having an output shaft controlling the axial movement of the spindle, a second shaft, an irreversible driving connection between said second shaft and the output shaft of the transmission and a reversible driving connection between the first-named shaft and a feeding means for said head.

4. In a machine tool embodying a vertically movable head, an axially movable spindle carried by the head, a reversible variable speed transmission having an output shaft controlling the axial movement of the spindle, a second shaft, an irreversibe driving connection between said second shaft and the output shaft of the transmission, a reversible driving connection between the first-named shaft and a feeding means for said head, and means to manually operate the output shaft of the transmission.

5. In a machine tool embodying a vertically movable head, an axially movable spindle carried by the head, a horizontally movable saddle and a table movable transversely upon the saddle, a reversible variable speed transmission having an output shaft, a feeding means for said spindle, a reversible connection between the output shaft of the transmission and said feeding means, a second shaft, an irreversible driving connection between said second shaft and the output shaft of the transmission and a reversible driving connection between the first-named shaft and feeding means for each of said head, said saddle and said table.

6. In a machine tool embodying a vertically movable head, an axially movable spindle carried by the head, a horizontally movable saddle and a table movable transversely upon the saddle, a reversible variable speed transmission having an output shaft, a feeding means for said spindle, a reversible connection between the output shaft of the transmission and said feeding means, a shaft, an irreversible driving connection between said shaft and the output shaft of the transmission, a reversible driving connection between the first-named shaft and feeding means for each of said head, said saddle and said table, and means to manually operate the output shaft of the transmission.

7. In a machine tool embodying a vertically movable head, an axially movable spindle carried by the head, a reversible variable speed transmission having an output shaft, a feeding means for said spindle, a reversible connection between the output shaft of the transmission and said feeding means, a second shaft, an irreversible driving connection between said second shaft and the output shaft of the transmission and a reversible driving connection between the first-named shaft and a feeding means for said head.

8. In a machine tool embodying a vertically movable head, an axially movable spindle carried by the head, a reversible variable speed transmission having an output shaft, a feeding means for said spindle, a reversible connection between the output shaft of the transmission and said feeding means, a second shaft, an irreversible driving connection between said second shaft and the output shaft of the transmission, a reversible driving connection between the first-named shaft and a feeding means for said head, and means to manually operate the output shaft of the transmission.

RALPH L. COTTA.